(12) United States Patent
Lin et al.

(10) Patent No.: US 10,698,305 B2
(45) Date of Patent: Jun. 30, 2020

(54) COLOR WHEEL MODULE AND PROJECTION APPARATUS

(71) Applicant: Coretronic Corporation, Hsin-Chu (TW)

(72) Inventors: Tsung-Han Lin, Hsin-Chu (TW); Tung-Chou Hu, Hsin-Chu (TW); Min-Hsueh Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/454,009

(22) Filed: Jun. 26, 2019

(65) Prior Publication Data
US 2020/0004128 A1    Jan. 2, 2020

(30) Foreign Application Priority Data

Jun. 28, 2018  (CN) .................... 2018 2 1009365 U

(51) Int. Cl.
| | |
|---|---|
| *G03B 21/14* | (2006.01) |
| *G03B 21/20* | (2006.01) |
| *G03B 21/16* | (2006.01) |
| *G02B 26/00* | (2006.01) |

(52) U.S. Cl.
CPC ........... *G03B 21/20* (2013.01); *G02B 26/008* (2013.01); *G03B 21/145* (2013.01); *G03B 21/16* (2013.01)

(58) Field of Classification Search
CPC ...... G03B 21/16; G03B 21/20; G03B 21/145; G03B 21/204; G03B 21/2013; G03B 21/2033; G03B 21/2053; F21S 10/00; F21S 10/02; F21S 10/007; F21S 10/026; F21S 10/063; H04N 9/3114; H04N 9/3141; H04N 9/3144

See application file for complete search history.

(56) References Cited

U.S. PATENT DOCUMENTS

| | | | |
|---|---|---|---|
| 9,423,676 B2 * | 8/2016 | Tsuchiya | ............... G03B 21/206 |
| 2004/0095767 A1 * | 5/2004 | Ohmae | ................. F21S 10/007 362/293 |

FOREIGN PATENT DOCUMENTS

| | | |
|---|---|---|
| TW | 200732725 A | 9/2007 |
| TW | 200815902 A | 4/2008 |

* cited by examiner

*Primary Examiner* — Sultan Chowdhury

(57) ABSTRACT

A color wheel module includes a fixing bracket, a carbon-iron alloy bracket, a motor, an optical filter, a first damper, and a second damper. The carbon-iron alloy bracket is fixed to the fixing bracket. The motor is fixed to the carbon-iron alloy bracket, and the motor is connected with the optical filter, so as to drive the optical filter to rotate between the motor and the fixing bracket. The first damper is disposed between the carbon-iron alloy bracket and the fixing bracket. The second damper is disposed between the motor and the carbon-iron alloy bracket.

11 Claims, 8 Drawing Sheets

COLOR WHEEL MODULE AND PROJECTION APPARATUS

CROSS-REFERENCE TO RELATED APPLICATION

This application claims the priority benefit of china application (CN201821009365.0 filed on 2018 Jun. 28). The entirety of the above-mentioned patent application is hereby incorporated by reference herein and made a part of this specification.

FIELD OF THE INVENTION

The invention relates to a color wheel module and a projection apparatus.

BACKGROUND OF THE INVENTION

A projection apparatus includes a light source, a color wheel module, a light valve, and a projection lens. The color wheel module includes a light filter and a motor. The light filter has a plurality of filtering portions. Different filtering portions can filter out different color lights. The motor drives the light filter to rotate at a high speed. As the light filter rotates, the illumination beam of the light source is sequentially converted into red, green, blue illumination beams after passing through the light filter. The red, green, blue illumination beams then enter the light valve, and are homogenized and converted into an image beam. The image beam is projected onto a screen by the projection lens. The color wheel module is not only applied to a projection apparatus using a high pressure mercury lamp as a light source, but also applied to a projection apparatus using a solid-state light source.

As the imaging processing technique advances, a projection apparatus may achieve a 4K resolution by using digital micro-mirror device (DMD) equipped with an actuator. To match the frequency of the actuator, a symmetrical color wheel is conventionally used, resulting in a reduction in brightness of the projection apparatus. To balance the needs in high resolution and high brightness of the projection apparatus, an asymmetrical color wheel module is conventionally utilized instead, and the rotation speed of color wheel is increased above 7200 r. p. m.

However, the increase in the rotation speed of color wheel causes an increase in the vibration amount of the light filter, the lightweight bracket of the color wheel module, and the like, thereby causing an increase in the overall vibration amount of the projection apparatus. Moreover, the increase in the rotation speed of color wheel causes a wind noise, and the increase in the overall vibration amount of the projection apparatus causes a vibration noise. The operation noise of the projection apparatus is greatly increased due to the wind noise and the vibration noise.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art

SUMMARY OF THE INVENTION

The invention provides a color wheel module, which can reduce vibration and operation noise.

The invention provides a projection apparatus, and the color wheel module thereof can reduce vibration and operation noise.

Other objectives and advantages of the invention can be further understood from the technical features disclosed by the invention.

In order to achieve one or partial or all of the above or other objectives, an embodiment of the invention provides a color wheel module, which includes a fixing bracket, a carbon-iron alloy bracket, a motor, a light filter, a first damper, and a second damper. The carbon-iron alloy bracket is fixed to the fixing bracket. The motor is fixed to the carbon-iron alloy bracket, and the motor is connected with the light filter, so as to drive the light filter to rotate between the motor and the fixing bracket. The first damper is disposed between the carbon-iron alloy bracket and the fixing bracket. The second damper is disposed between the motor and the carbon-iron alloy bracket.

In order to achieve one or partial or all of the above or other objectives, an embodiment of the invention provides a projection apparatus, which includes a casing, a light valve, a projection lens, a control unit, a light source, and the color wheel module described-above. The light valve, the projection lens, and the control unit are disposed in the casing, and the control unit is electrically connected with the color wheel module, the light source, and the light valve. A fixing bracket of the color wheel module is fixed to the casing. The light source is configured to provide an illumination beam. The light filter is disposed on a transmission path of the illumination beam. The light valve is disposed on a transmission path of the illumination beam passing through the light filter, so as to convert the illumination beam passing through the light filter into an image beam. The projection lens is disposed on a transmission path of the image beam.

In the color wheel module and the projection apparatus of the embodiments of the invention, by using the carbon-iron alloy bracket, and the first damper disposed between the fixing bracket and the carbon-iron alloy bracket, not only the vibration of the color wheel module during the high-speed rotation of the light filter is suppressed, but also the vibration transmitted from the color wheel module to the casing is reduced. Therefore, the operation noise of the projection apparatus may be effectively reduced.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and the accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
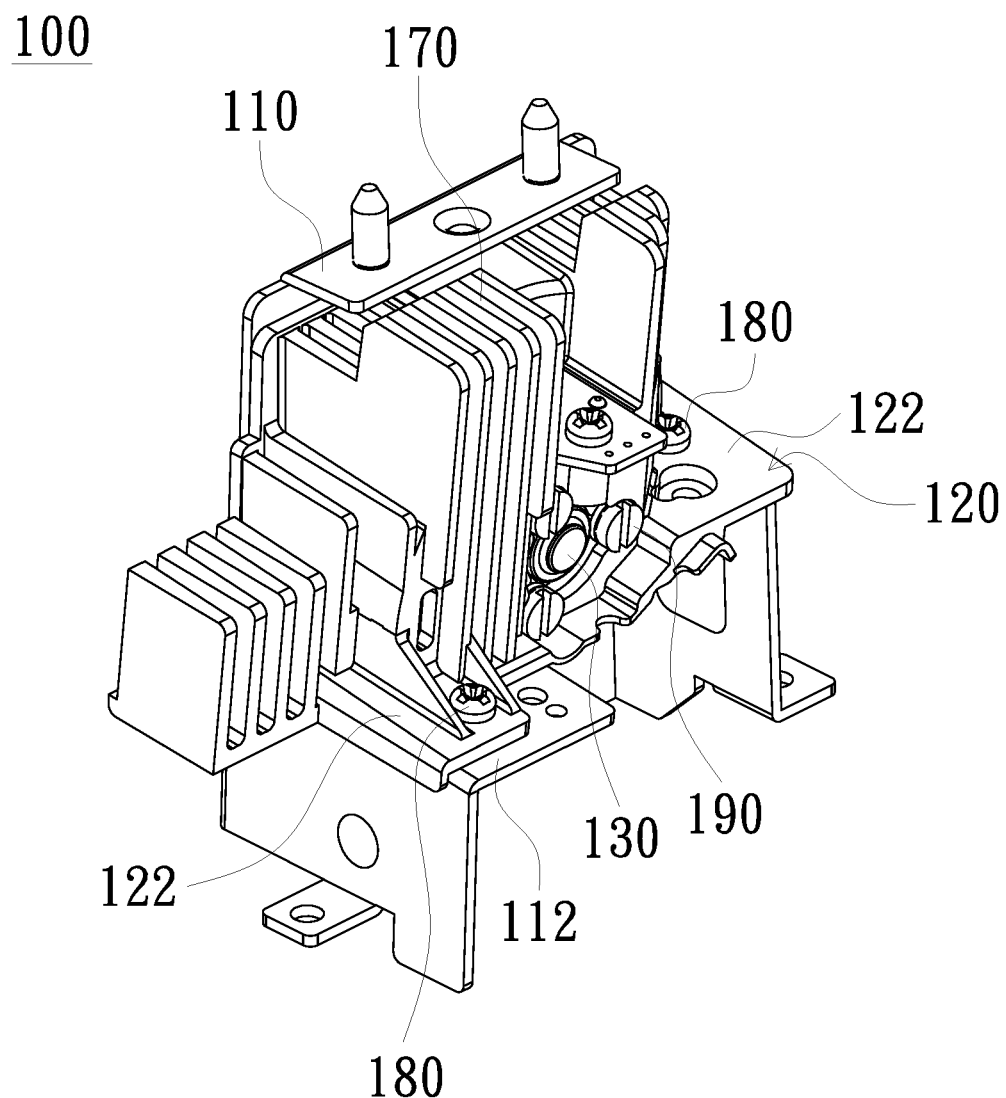
FIG. 1 is a schematic view of a color wheel module in accordance with an embodiment of the invention.
Figure 2:
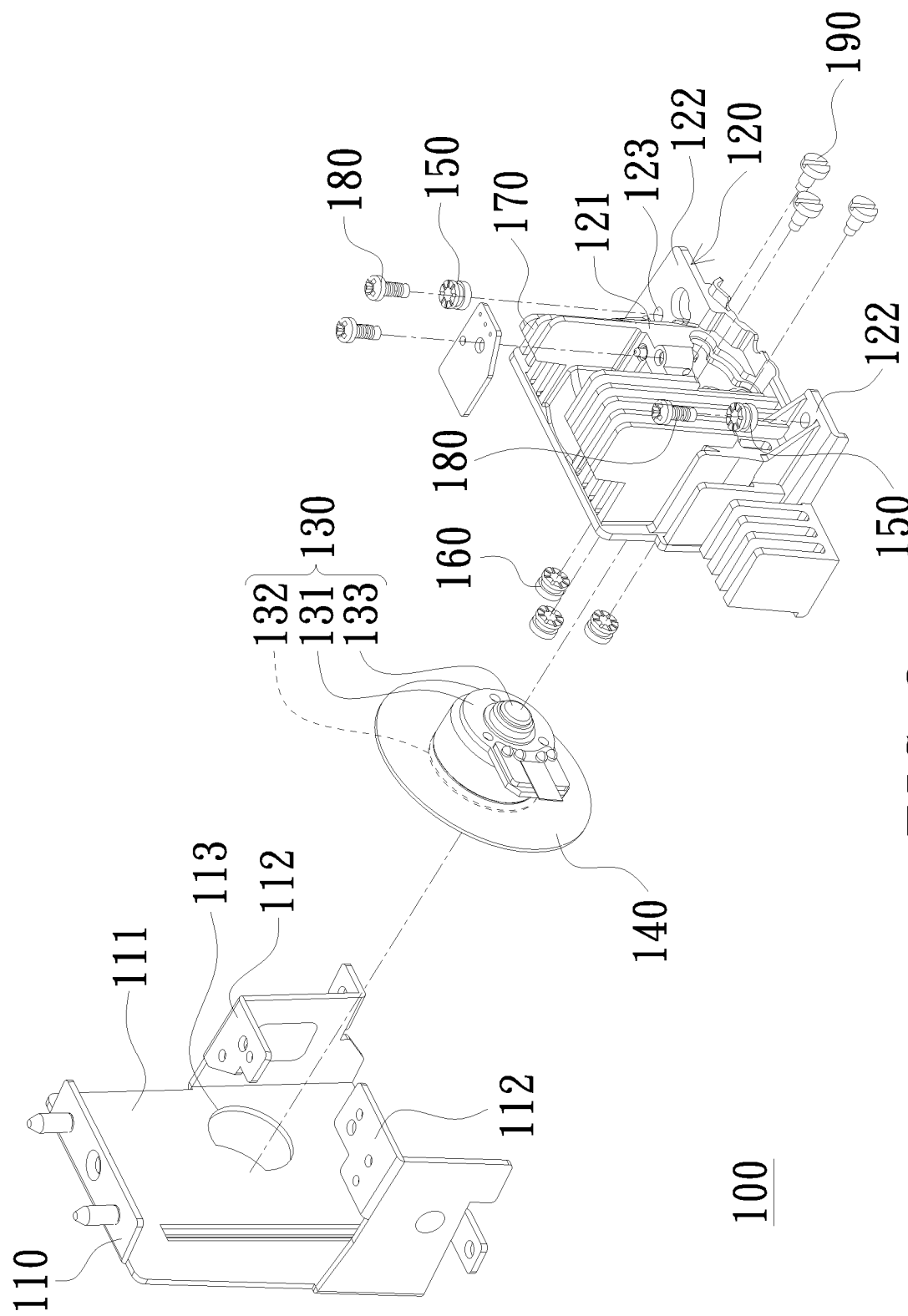
FIG. 2 is a front exploded view of the color wheel module in FIG. 1.
Figure 3:
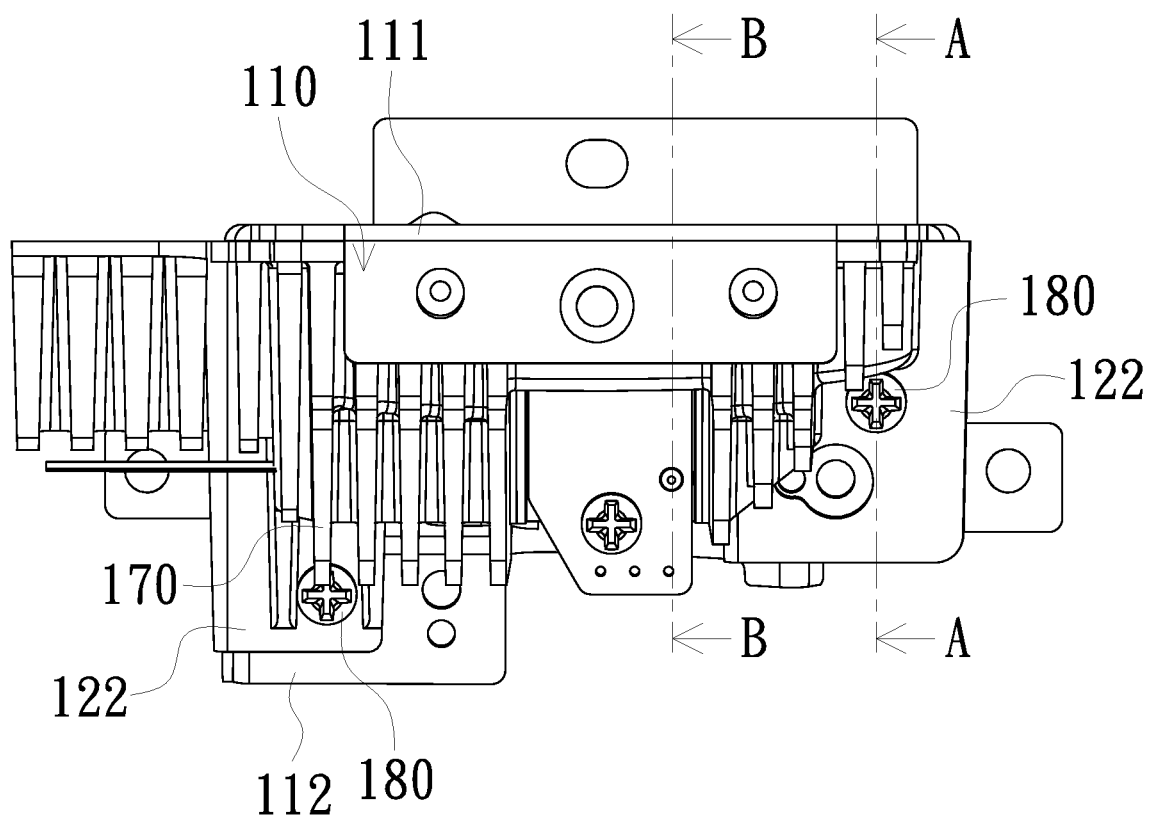
FIG. 3 is a top plan view of the color wheel module in FIG. 1.
Figure 4:
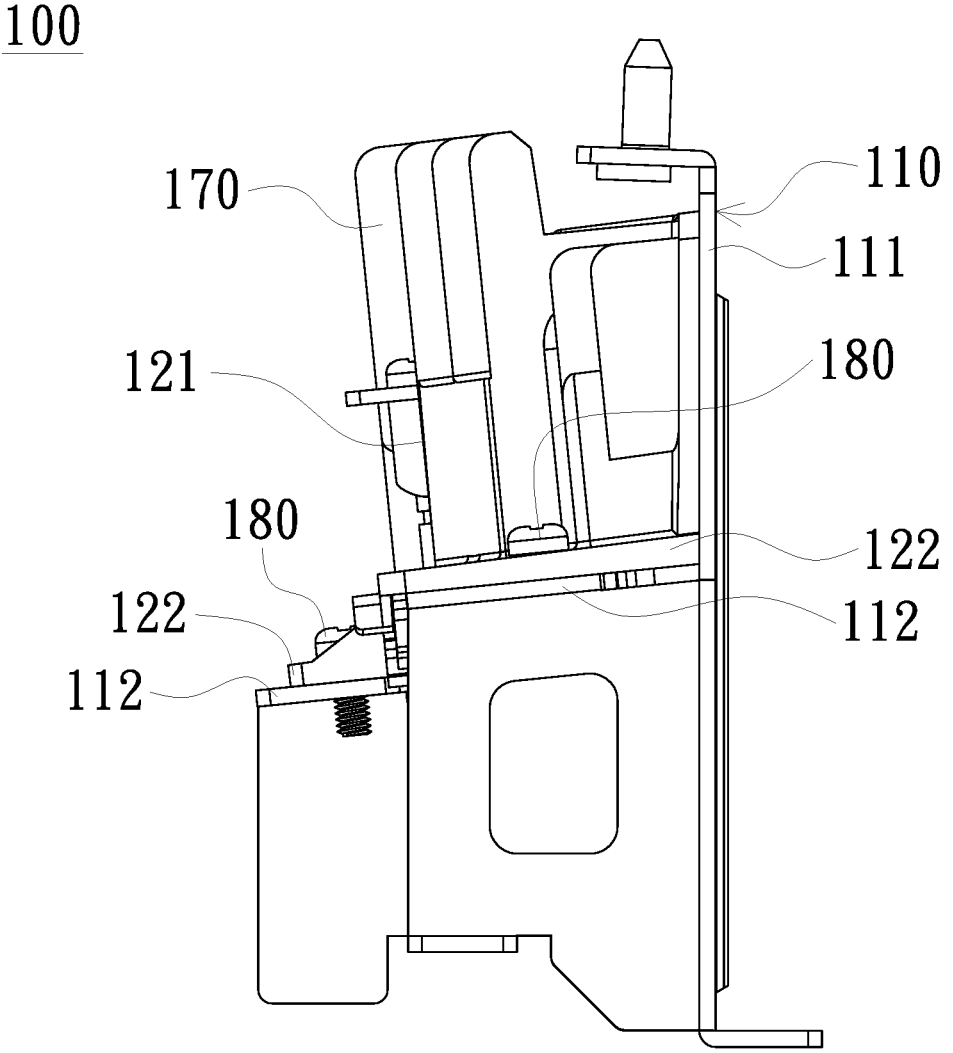
FIG. 4 is a right plan view of the color wheel module in FIG. 1.
Figure 5:
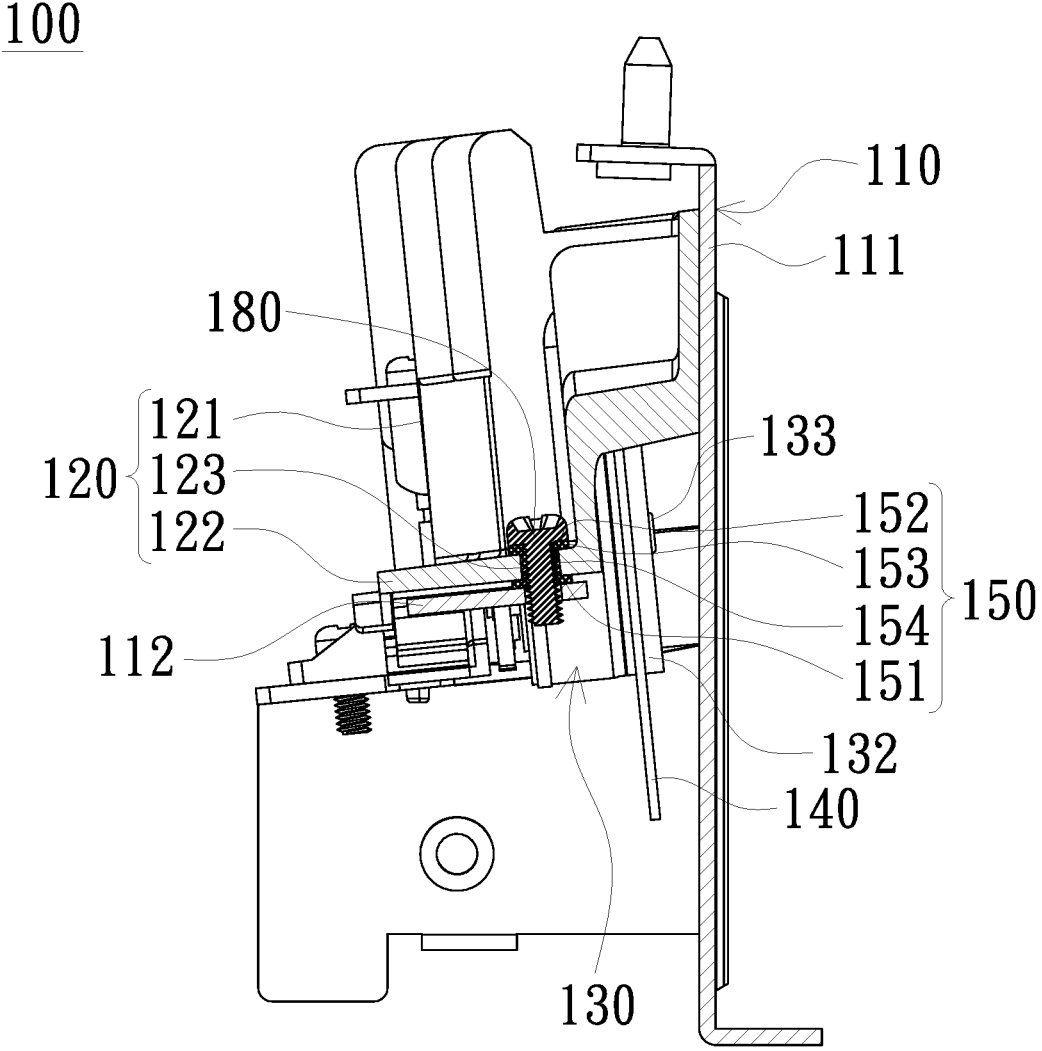
FIG. 5 is a cross-sectional view taken along the line A-A in FIG. 3.
Figure 6:
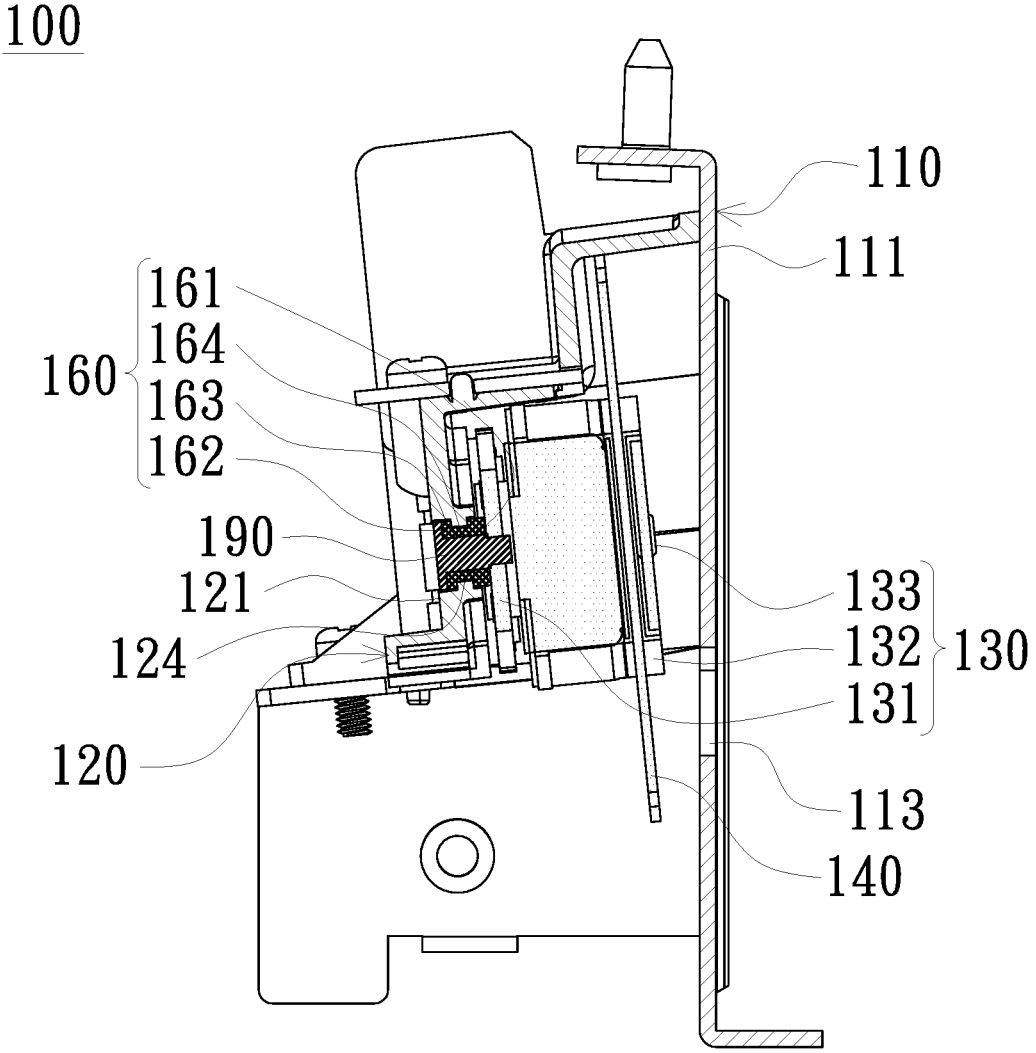
FIG. 6 is a cross-sectional view taken along the line B-B in FIG. 3.

FIG. 1 is a schematic view of a color wheel module in accordance with an embodiment of the invention. FIG. 2 is a front exploded view of the color wheel module of FIG. 1. FIG. 3 is a top plan view of the color wheel module of FIG. 1. FIG. 4 is a right plan view of the color wheel module of FIG. 1. FIG. 5 is a cross-sectional view taken along line A-A in FIG. 3. FIG. 6 is a cross-sectional view taken along line B-B in FIG. 3. Referring to FIGS. 1 to 6, the color wheel module 100 of the embodiment includes a fixing bracket 110, a carbon-iron alloy bracket 120, a motor 130, a light filter 140, a first damper 150, and a second damper 160. The carbon-iron alloy bracket 120 is fixed to the fixing bracket 110. The motor 130 is fixed to the carbon-iron alloy bracket 120, and the motor 130 is connected with the light filter 140, so as to drive the light filter 140 to rotate between the motor 130 and the fixing bracket 110. The first damper 150 is disposed between the carbon-iron alloy bracket 120 and the fixing bracket 110, and is configured to suppress the vibration of the carbon-iron alloy bracket 120, the vibration of the fixing bracket 110, and the relative vibration between the carbon-iron alloy bracket 120 and the fixing bracket 110. The second damper 160 is disposed between the motor 130 and the carbon-iron alloy bracket 120, and is configured to suppress the vibration of the motor 130, the vibration of the carbon-iron alloy bracket 120, and the relative vibration between the motor 130 and the carbon-iron alloy bracket 120. The number of the first damper 150 and the number of the second damper 160 may be set to one or more. FIG. 2 is exemplified by two first dampers 150 and three second dampers 160, but the invention is not limited thereto. In addition, the materials of the first damper 150 and the second damper 160 may be rubber or metal. The rubber may be, for example, acrylic ester, silicone rubber, polyurethane, or the like. The metal may be, for example, Cu—Al—Zn alloys, Fe—Cr—Mo alloys, Mn—Cu alloys, or the like. Further, the color wheel module 100 may include a heat dissipation fin 170. The heat dissipation fin 170 is disposed on a side of the carbon-iron alloy bracket 120 away from the motor 130.

An amount of the carbon in the carbon-iron alloy bracket 120 described-above is above 0.5 wt % based on the overall material composition of the carbon-iron alloy bracket 120. The material of the carbon-iron alloy bracket 120 may be carbon steel or grey cast iron. Accordingly, the carbon-iron alloy bracket 120 may be more desirable in vibration suppression, so as to achieve a better vibration suppression effect.

The color wheel module 100 described-above may include a first fixing member 180 and a second fixing member 190. The first fixing member 180 is disposed on the carbon-iron alloy bracket 120, the fixing bracket 110, and the first damper 150. The relative positions of the carbon-iron alloy bracket 120 and the fixing bracket 110 are fixed by using the fixing member 180. The second fixing member 190 is disposed on the motor 130, the carbon-iron alloy bracket 120, and the second damper 160. The relative positions of the motor 130 and the carbon-iron alloy bracket 120 are fixed by using the second fixing member 190. In the embodiment, the first fixing member 180 and the second fixing member 190 may be, for example, screws. In addition, the first fixing member 180 is mounted through the carbon-iron alloy bracket 120, the first damper 150, and the fixing bracket 110, and the second fixing member 190 is mounted through the carbon-iron alloy bracket 120, the second damper 160, and the motor 130. Furthermore, the number of the first fixing member 180 may be one or more, and may be different from or the same as the number of the first damper 150. FIG. 2 is exemplified by two first dampers 150 and two first fixing members 180, and each of the first fixing members 180 is mounted through one of the two first dampers 150 respectively, but the invention is not limited thereto. The number of the second fixing member 190 may be one or more, and may be different from or the same as the number of the second damper 160. FIG. 2 is exemplified by three second dampers 160 and three second fixing members 190, and each of the second fixing members 190 is mounted through one of the three second dampers 160 respectively, but the invention is not limited thereto. In other embodiments, one second damper may be used with three second fixing members, and the three second fixing members are all mounted through the one second damper.

The motor 130 described-above may have a first end 131, a second end 132 opposite to the first end 131 in position, and a rotor 133. The first end 131 is fixed to the carbon-iron alloy bracket 120. The second end 132 faces the fixing bracket 110. The rotor 133 is disposed between the first end 131 and the second end 132, and is used to drive the light filter 140 to rotate. The second damper 160 is disposed between the first end 131 and the carbon-iron alloy bracket 120. The second fixing member 190 is disposed at the carbon-iron alloy bracket 120, the second damper 160, and the first end 131. In addition, the second fixing member 190 is mounted through the carbon-iron alloy bracket 120, the second damper 160, and the first end 131 of the motor 130. The light filter 140 is disposed at the second end 132.

The light filter 140 may include a plurality of filtering portions. The colors of these filtering portions are at least partially different. The colors of these filtering portions may be, for example, red, green, and blue sequentially. When the light filter 140 is driven to rotate by the motor 130, the illumination beam of the light source sequentially passes through these filtering portions. In case that the illumination beam is a white beam, the illumination beam is sequentially converted into a red light, a green light, and a blue light after sequentially passing through these filtering portions. The numbers, colors, and the arrangement orders of these filtering portions are not limited to the invention, and other proper numbers, colors, and arrangement orders of these filtering portions may be also be used.

The fixing bracket 110 may further include a blocking portion 111 and a mounting portion 112. An opening 113 is formed on the blocking portion 111. The mounting portion 112 is adjacent to the blocking portion 111. The light filter 140 faces the opening 113. The illumination beam of the light source may radiate on the light filter 140 via the opening 113. In addition, the carbon-iron alloy bracket 120 described-above may further include a covering portion 121 and a connecting portion 122. The covering portion 121 covers the motor 130 and the light filter 140, so that the motor 130 and the light filter 140 are encapsulated between the covering portion 121 and the fixing bracket 110. The connecting portion 122 is connected with the covering portion 121, and the carbon-iron alloy bracket 120 is fixed to the mounting portion 112 by the connecting portion 122. The first damper 150 is disposed between the connecting portion 122 and the mounting portion 112, the second damper 160 is disposed between the first end 131 of the motor 130 and the covering portion 121, and the first end 131 of the motor 130 is fixed to the covering portion 121. The covering portion 121 may block dust, thereby preventing the dust from attaching onto the light filter 140. The first fixing member 180 is mounted through the connecting portion 122, the first damper 150, and the mounting portion 112. The second fixing member 190 is mounted through the covering portion 121, the second damper 160, and the first end 131.

In addition, the connecting portion 122 of the carbon-iron alloy bracket 120 may be formed with a first through-hole and a first through-hole wall 123 surrounding the first through-hole. The first damper 150 described-above may be ring-shaped and further have a first inner-end 151, a first outer-end 152, and a first outer ring surface 153. The first outer ring surface 153 is connected between the first inner-end 151 and the first outer-end 152. A first recess 154 is formed on the first outer ring surface 153. The first damper 150 is mounted into the first through-hole. The first through-hole wall 123 is embedded with the first recess 154. The first inner-end 151 of the first damper 150 abuts against the mounting portion 112 of the fixing bracket 110. The first fixing member 180 is mounted into the first damper 150, abuts against the first outer-end 152, and is located in the first through-hole.

Furthermore, the covering portion 121 of the carbon-iron alloy bracket 120 may be formed with a second through-hole and a second through-hole wall 124 surrounding the second through-hole. The second damper 160 described-above may further have a second inner-end 161, a second outer-end 162, and a second outer ring surface 163. A second recess 164 may be formed on the second outer ring surface 163. The second damper 160 is mounted into the second through-hole. The second through-hole wall 124 is embedded with the second recess 164. The second inner-end 161 of the second damper 160 abuts against the first end 131 of the motor 130. The second fixing member 190 is mounted into the second damper 160, abuts against the second outer-end 162, and is located in the second through-hole.

In the color wheel module 100 of the embodiment, since the carbon-iron alloy bracket 120 has a good performance in vibration absorbing and may have a larger weight than a lightweight bracket (such as, a magnesium bracket, or aluminum bracket), the carbon-iron alloy bracket 120 can effectively suppress the vibration of the color wheel assemble 100 during the high speed rotation of the light filter 140. The carbon-iron alloy bracket 120 is fixed to the fixing bracket 110. The color wheel module 100 is fixed to fix the casing of a projection apparatus by using the fixing bracket 110. The first damper 150 is disposed between the fixing bracket 110 and the carbon-iron alloy bracket 120. In such a configuration, the vibration of the color wheel module 100 generated during the high-speed rotation of the light filter 140 may be absorbed by the first damper 150, and the vibration transmitted from the color wheel module 100 to the projection apparatus may thus be reduced, thereby reducing the operation noise of the projection apparatus. Therefore, by using the carbon-iron alloy bracket 120 and the first damper 150, the color wheel module 100 of the embodiment can effectively reduce vibration and operation noise.

Figure 7:
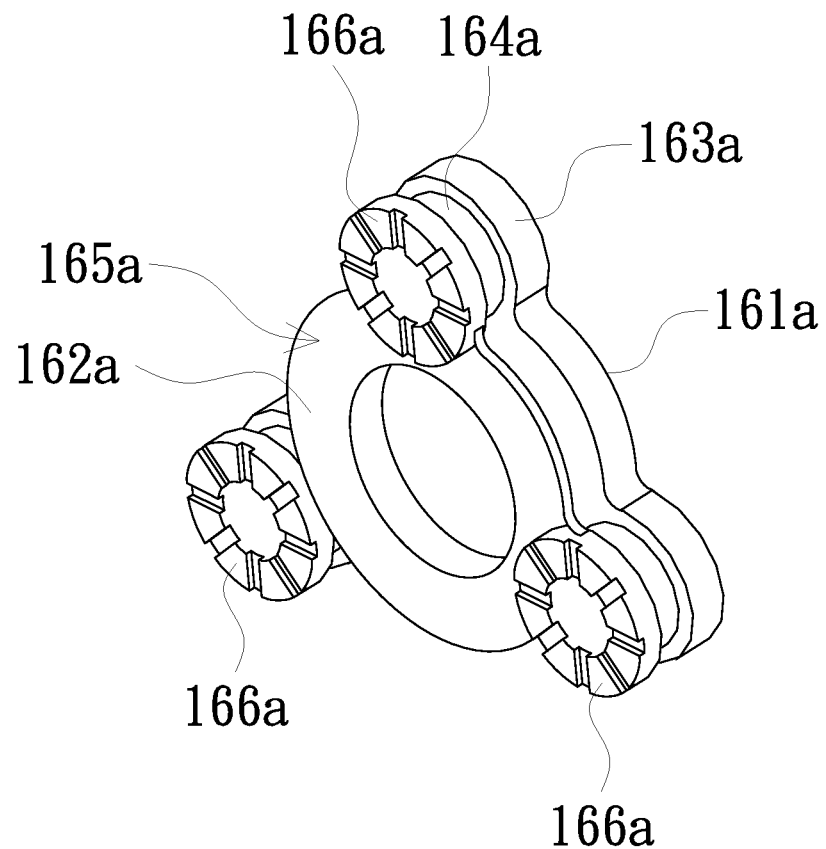
FIG. 7 is a schematic view of a second damper of a color wheel module in accordance with an embodiment of the invention.

FIG. 7 is a schematic view of a second damper of a color wheel module in accordance with an embodiment of the invention. Referring to FIGS. 2 and 7, in an embodiment, the second damper 160a may include a linking portion 165a and a plurality of fixing portions 166a. The linking portion 165a is connected among the fixing portions 166a. The second fixing member 190 is mounted through the carbon-iron alloy bracket 120, the fixing portions 166a, and the first end 131 of the motor 130. The number of the second fixing members 190 may be disposed according to the number of the fixing portions 166a. For example, three second fixing members 190 are used with three fixing portions 166a, but the invention is not limited thereto. The rear side surface of the linking portion 165a and the rear side surface of the fixing portions 166a are connected to form the second inner-end 161a. The front side surface of the linking portion 165a and the front side surface of the fixing portions 166a are connected to form the second outer-end 162a. The outer side surface of the linking portion 165a and the outer side surfaces of the fixing portions 166a are connected to form the second outer ring surface 163a. The outer side surface of the linking portion 165a and the outer side surfaces of the fixing portions 166a are inwardly recessed to form the second recess 164a. In addition, the linking portion 165a is ring-shaped in FIG. 7, such that the linking portion 165a may be sleeved on the first end 131 of the motor 130 shown in FIG. 2. However, the invention is not limited thereto. The linking portion 165a may be, for example, arc-shaped, strip-shaped, or the like. The fixing portions 166a is connected by using the linking portion 165a. As such, the contact area of the whole second damper 160a to the motor 130 and the carbon-iron alloy bracket 120 is increased, such that the vibration of the motor 130, the vibration of the carbon-iron alloy bracket 120, or/and the relative vibration between the motor 130 and the carbon-iron alloy bracket 120 during the rotation of the light filter 140r may be suppressed.

Figure 8:
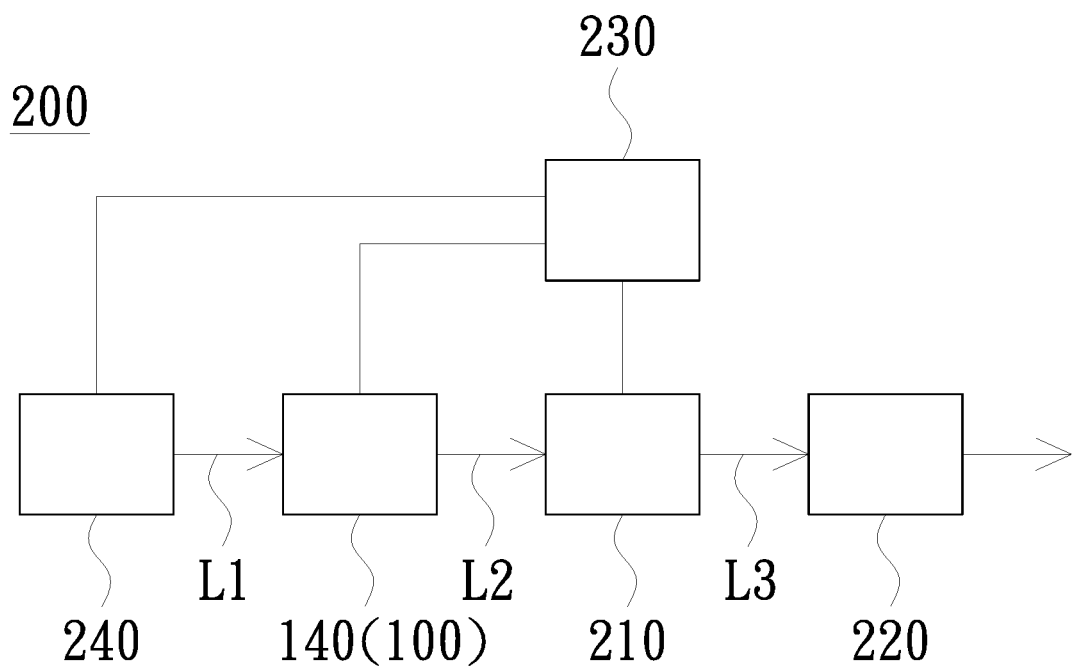
FIG. 8 is a block diagram of a projection apparatus in accordance with an embodiment of the invention.

FIG. 8 is a block diagram of a projection apparatus in accordance with an embodiment of the invention. Referring to FIGS. 2 and 8, the projection apparatus 200 of the embodiment includes a casing (not show in the figures), a light valve 210, a projection lens 220, a control unit 230, a light source 240, and a color wheel module 100. The light valve 210, the projection lens 220, and the control unit 230 are disposed in the casing, and the control unit 230 is electrically connected with the color wheel module 100, the light source 240, and the light valve 210. The fixing bracket 110 of the color wheel module 100 is fixed to the casing. The light source 240 is configured to provide an illumination beam L1. The light filter 140 is disposed on the transmission path of the illumination beam L1. The light valve 210 is disposed on the transmission path of the illumination beam L1 passing through the light filter 140 (the illumination beam L1 passing through the light filter 140 is denoted as L2 in FIG. 8), so as to convert the illumination beam passing through the light filter 140 into an image beam L3. The projection lens 220 is disposed on the transmission path of the image beam L3 to project the image beam L3 onto a screen, so as to form an image frame on the screen. Although FIG. 8 is illustrated by using the color wheel module in FIG. 2 as an example, the color wheel module illustrated in FIG. 8 may be replaced with a color wheel module described in any of the above-mentioned embodiments.

The light source 240 described-above may be, for example, a solid-state light source or a gas light source. The solid-state light source is, for example, a diode module including a light emitting diode or a laser diode (LD), or a diode array including a plurality of diode modules. The gas light source is, for example, an ultra high pressure (UHP) lamp. When the light source 240 is a solid-state light source, the light source 240 may be disposed in the casing and the color wheel module 100 may be fixed in the casing. When the light source 240 is a gas light source, the light source 240 may be disposed outside the casing and the color wheel module 100 may be fixed outside the casing. Nevertheless, the invention does not limit the arrangement positions of the light source 240 and the color wheel module 100.

The light valve 210 described-above may be a transmissive light valve or a reflective light valve. The transmissive light valve may be a transmissive liquid crystal panel, and the reflective light valve may be a digital micro-mirror device (DMD) or a liquid crystal on silicon (LCOS) panel, but the invention is not limited thereto. The projection lens 220 described-above may include, for example, a combination of one or more optical lenses, and the one or more optical lenses may have a non-zero diopter. For example, a variety of combinations of non-planar lenses may be used, and the non-planar lenses include a biconcave lens, a biconvex lens, a concavo-convex lens, a convexo-concave lens, a plano-convex lens, and a plano-concave lens. In an embodiment, the projection lens 220 may also include a planar optical lens. The type and species of the projection lens 220 are not limited in the invention.

The illumination beam L1 described-above can be converted into a red beam, a green beam, or a blue beam after passing through the light filter 140. In other words, the illumination beam L2 passing through the light filter 140 includes the red beam, the green beam, and the blue beam. The control unit 230 may calculate the timing when the red beam, the green beam, or the blue beam is generated according to a signal received, and control the light valve 210 according to an image signal received, so that the light valve 210 may be operated in different states to convert the illumination beam L2 passing through the light filter 140 into image lights of different colors, such as a red image light, a green light, and/or a blue image light. That is, the image light L3 includes a red image light, a green image light and a blue image light. The projection lens 220 may project these image lights onto a screen, so as to form a full color image corresponding to the image signal on the screen. Furthermore, the image signal is, for example, provided by a video player or a computer.

In summary, in the color wheel module and the projection apparatus of the embodiments of the invention, by using the carbon-iron alloy bracket and the first damper disposed between the fixing bracket and the carbon-iron alloy bracket, not only the vibration of the color wheel module generated during the high-speed rotation of the light filter is suppressed, but also the vibration transmitted from the color wheel module to the casing is reduced. Therefore, the operation noise of the projection apparatus may be effectively reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A color wheel module, comprising:
   a fixing bracket;
   a carbon-iron alloy bracket;
   a motor;
   a light filter;
   a first damper; and
   a second damper,
   wherein the carbon-iron alloy bracket is fixed to the fixing bracket, the motor is fixed to the carbon-iron alloy bracket, and the motor is connected with the light filter, so as to drive the light filter to rotate between the motor and the fixing bracket,
   wherein the first damper is disposed between the carbon-iron alloy bracket and the fixing bracket, and
   wherein the second damper is disposed between the motor and the carbon-iron alloy bracket.

2. The color wheel module of claim 1, wherein an amount of the carbon in the carbon-iron alloy bracket is above 0.5 wt % based on an overall material composition of the carbon-iron alloy bracket.

3. The color wheel module of claim 2, wherein a material of the carbon-iron alloy bracket includes a carbon steel or a grey cast iron.

4. The color wheel module of claim 1, further comprising:
   a first fixing member and a second fixing member,
   wherein the first fixing member is disposed on the carbon-iron alloy bracket, the first damper, and the fixing bracket, and
   wherein the second fixing member is disposed on the carbon-iron alloy bracket, the second damper, and the motor.

5. The color wheel module of claim 4,
   wherein the second damper further comprises:
   a plurality of fixing portions; and
   a linking portion,
   wherein the linking portion is connected among the plurality of fixing portions, a number of the second fixing members is plural, and each of the second fixing members is disposed on the carbon-iron alloy bracket, one of the plurality of fixing portions, and the motor.

6. The color wheel module of claim 5, wherein the linking portion is ring-shaped.

7. The color wheel module of claim 6, wherein the motor has a first end, a second end opposite to the first end in position, and a rotor, wherein the first end is fixed to the carbon-iron alloy bracket, the second end faces the fixing bracket, and the rotor is disposed between the first end and the second end, so as to drive the light filter to rotate, wherein the second damper is disposed between the first end and the carbon-iron alloy bracket, the second damper is sleeved on the first end, and each of the second fixing members is disposed on the carbon-iron alloy bracket, one of the plurality of the fixing portions, and the first end, and wherein the light filter is disposed at the second end.

8. The color wheel module of claim 1, wherein the fixing bracket further comprises:
   a blocking portion; and
   a mounting portion,
   wherein an opening is formed on the blocking portion, the mounting portion is adjacent to the blocking portion, and the light filter faces the opening, and
   wherein the carbon-iron alloy bracket is fixed to the mounting portion, and the first damper is disposed between the carbon-iron alloy bracket and the mounting portion.

9. The color wheel module of claim 8, wherein the carbon-iron alloy bracket further comprises:
   a covering portion; and
   a connecting portion,
   wherein the covering portion covers the motor and the light filter, the connecting portion is connected with the covering portion, and the connecting portion is fixed to the mounting portion,
   wherein the first damper is disposed between the connecting portion and the mounting portion, the motor is fixed to the covering portion, and the second damper is disposed between the motor and the covering portion.

10. The color wheel module of claim 1, further comprising:
    a heat dissipation fin, wherein the heat dissipation fin is disposed on a side of the carbon-iron alloy bracket away from the motor.

11. A projection apparatus, comprising:
    a casing;
    a light valve;
    a projection lens;
    a control unit;
    a light source; and
    a color wheel module,
    wherein the light valve, the projection lens, and the control unit are disposed in the casing, and the control unit is electrically connected with the color wheel module, the light source, and the light valve,
    wherein the color wheel module comprises:
    a fixing bracket;
    a carbon-iron alloy bracket;
    a light filter;
    a motor;
    a first damper; and
    a second damper,
    wherein the fixing bracket is fixed to the casing, the carbon-iron alloy bracket is fixed to the fixing bracket, the motor is fixed to the carbon-iron alloy bracket, and the motor is connected with the light filter, so as to drive the light filter to rotate between the motor and the fixing bracket,
    wherein the first damper is disposed between the carbon-iron alloy bracket and the fixing bracket, and the second damper is disposed between the motor and the carbon-iron alloy bracket,
    wherein the light source is configured to provide an illumination beam, the light filter is disposed on a transmission path of the illumination beam, the light valve is disposed on the transmission path of the illumination beam passing through the light filter, so as to convert the illumination beam passing through the light filter into an image beam, and
    wherein the projection lens is disposed on a transmission path of the image beam.

* * * * *